July 26, 1949.    W. MOFFATT    2,477,261
WELDED BRACE INTERSECTION FITTING
FOR TUBULAR STRUCTURES
Filed Sept. 12, 1947
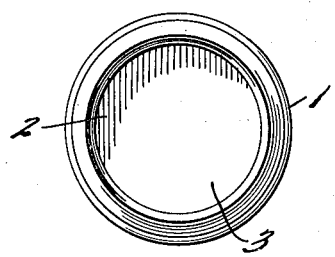
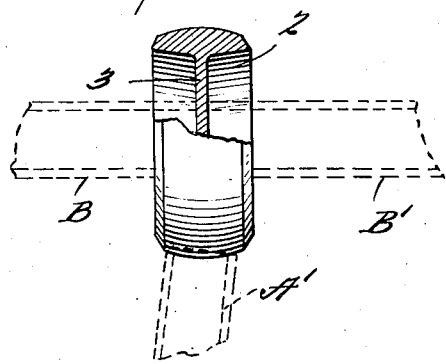
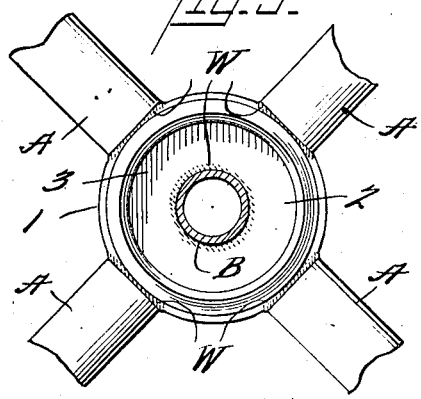
INVENTOR.
Wilder Moffatt
BY
ATTORNEY Patented July 26, 1949

2,477,261

UNITED STATES PATENT OFFICE 2,477,261

WELDED BRACE INTERSECTION FITTING FOR TUBULAR STRUCTURES

Wilder Moffatt, Upper Macungie Township, Lehigh County, Pa., assignor to Nassau Products, Allentown, Pa., a corporation of Pennsylvania Application September 12, 1947, Serial No. 773,696

7 Claims. (Cl. 287—54)

1

This invention relates to metallic fittings of the kind that are used in the manufacture of tubular frame structures to serve as welded anchorages for the ends of a plurality of brace pipes disposed in radially convergent relation.

An important object of my invention is to provide a welded intersection fitting of the above character which is so constructed and arranged as to provide a solid footing for the ends of the brace pipes which latter may be cut off square— that is, perpendicular to their longitudinal axis.

More particularly my invention has for its object to provide a welded intersection fitting of the above character which is of generally disk shape and which has a convex, spheroidally rounded circumference against which the ends of the brace pipes are adapted to abut in circular line contact and to be secured by welding. In the preferred form of my invention the opposite sides of the fitting provide flat surfaces which lie parallel to each other and serve as abutments for the square-cut ends of pipes, tubes or rods adapted to be welded to the fitting and project at right angles therefrom.

A further object of my invention is to provide a welded intersection fitting of the above character in which either one or both sides of the generally disk-shaped fitting are recessed to define flat-bottomed cups separated by a comparatively thin web, and which fitting can be readily produced by casting or forging to insure a rigid construction.

Other objects and advantages will be apparent from the following detailed description of a preferred embodiment of the invention, reference being had to the annexed drawing in which:

Figure 1 is a side view of a welded intersection fitting embodying the invention;

Figure 2 is an end view of the fitting of Fig. 1, a part thereof being broken away for greater clearness and the ends of the brace pipes to be connected being indicated in phantom lines; and Figure 3 shows one manner in which the intersection fitting is adapted to be used in the manufacture of tubular frame structures.

In the drawing is shown a welded intersection fitting comprising a metal disk having a comparatively wide circumferential portion I which is convexly and spheroidally rounded in transverse cross-section throughout its circumference and having its center of spherical curvature coinciding with the axis of the disk. The opposite sides of the fitting are recessed to define cups, as indicated at 2, the bottoms of the cups being formed by a relatively thin, flat web of metal 3

2 medially located between the two sides of the fitting and its flat sides lying in planes perpendicular to the axis of the fitting. The two cups 2 are disposed in axial alignment and open in slightly expanding relation toward opposite sides of the fitting.

In use, the fitting is adapted to be interposed between the adjacent ends of a plurality of brace pipes A—herein shown as four in number—with the square cut ends of these brace pipes abutting and making solid, circular-line contact with the spheroidal circumferential surface of the fitting and being welded thereto, as indicated at W in Fig. 3.

Entering one of the cups 2 is a brace pipe B, its square-cut end making flush engagement with a flat face of the web and being bonded thereto by welding W. If desired another brace pipe $B^1$ similar to the pipe B may abut the opposite face of the web 3, as indicated in dotted lines in Fig. 2; or the web 3 may be conveniently recessed— being of comparatively small thickness—to afford transverse passage for a single pipe (corresponding to the pipes B and $B^1$ of Fig. 2) through the fitting and to which pipe the fitting may be secured by welding.

Because of the spheroidal surface of the circumferential portion I, the square-cut end of a pipe of any diameter (not exceeding the width of the disk) will make solid, line engagement with the fitting and when welded thereto will provide a strong rigid joint. Furthermore, the radially directed brace pipes need not lie exactly in the same plane with each other or with the fitting for, as indicated in dotted lines in Fig. 2, a brace pipe $A^1$ even if inclined slightly out of the plane of the fitting will nevertheless make continuous line-contact with the fitting and permit a good welded joint to be made therewith. This is an important consideration in the manufacture of tubular frame structures which usually require a great number of such welded joints and which at the same time must be produced rapidly and under conditions where it is not practicable to accurately line up the pipes with each other and with the fitting preparatory to welding.

The term "welded" is used herein in a general sense to also include brazed, soldered or similarly bonded joints such as are well-known in the metal working art.

The term "rigid" as applied to the disk is intended to imply the degree of rigidity corresponding to cast or forged metal article, as distinguished from an article made of sheet metal. The web 3, while shown as imperforate, may be originally provided with a small opening for the escape of air entrapped within a pipe end and expanded during the welding operation. The web in any event is substantially imperforate, by which term is meant a web that either may or may not be initially provided with a small vent.

While I have described and illustrated a preferred form of my welded intersection fitting, it is to be understood that various changes in construction and design may be made in the fitting without departing from the spirit of my invention as defined by the following claims.

I claim:

1. A welded connector fitting for tubular frame structures comprising a rigid, unitary circular metal disk having a relatively wide circumferential portion of convex spheroidal shape having its center of spherical curvature coinciding with the axis of the disk and at least one of the sides of the disk being substantially imperforate and being flattened throughout a substantial central area.

2. A welded connector fitting for tubular frame structures comprising a rigid, unitary circular metal disk having a relatively wide circumferential portion of convex spheroidal shape having its center of spherical curvature coinciding with the axis of the disk and opposite sides of said disk being substantially imperforate and being flattened throughout substantial central areas.

3. A welded connector fitting for tubular frame structures comprising a rigid, unitary circular metal disk having a relatively wide circumferential portion of convex spheroidal shape having its center of spherical curvature coinciding with the axis of the disk and opposite sides of said disk being substantially imperforate and being flattened throughout substantial central areas and lying parallel to each other.

4. A welded connector fitting for tubular frame structures comprising a rigid, unitary circular metal disk having a relatively wide circumferential portion of convex spheroidal shape having its center of spherical curvature coinciding with the axis of the disk and at least one side of said disk being substantially imperforate and being recessed to provide a cup, said cup having a flat bottom lying in a plane perpendicular to the axis of the disk.

5. A welded connector fitting for tubular frame structures comprising a rigid, unitary circular metal disk having a relatively wide circumferential portion of convex spheroidal shape having its center of spherical curvature coinciding with the axis of the disk and the opposite sides of said disk being substantially imperforate and being recessed to provide cups separated by a relatively thin web of metal, said web being medially disposed between the sides of the disk and having flat sides lying in parallel planes perpendicular to the axis of the disk.

6. A welded connection for tubular frame structures comprising in combination a plurality of tubular frame members having their axes disposed in substantially radially convergent relation, a rigid, unitary, circular metal disk having a relatively wide circumferential portion of convex spheroidal shape with its center of spherical curvature coinciding with the axis of the disk and at least one of the sides of the disk being substantially imperforate and flattened throughout a substantial central area thereof, one of said tubular frame members being welded to the circumference of the disk and another of said tubular frame members being welded to the flattened central area of the disk.

7. A welded connection for tubular frame structures as set forth in claim 6 in which the side of the disk to which one of the tubular frame members is welded is recessed to provide a cup having a flattened bottom lying in a plane perpendicular to the axis of the disk.

WILDER MOFFATT.

REFERENCES CITED

The following references are of record in the file of this patent:

UNITED STATES PATENTS

| Number | Name | Date |
| --- | --- | --- |
| 551,547 | Howard | Dec. 17, 1895 |
| 581,216 | Merl | Apr. 20, 1897 |
| 687,838 | Keiper | Dec. 3, 1901 |
| 870,791 | Mosman | Nov. 12, 1907 |
| 1,625,812 | Leon | Apr. 26, 1927 |
| 1,642,502 | Krasberg | Sept. 13, 1927 |
| 1,762,766 | De Garay | June 10, 1930 |